Aug. 6, 1929.     F. R. WEYMOUTH     1,723,962
FOLDING WING
Filed March 31, 1927
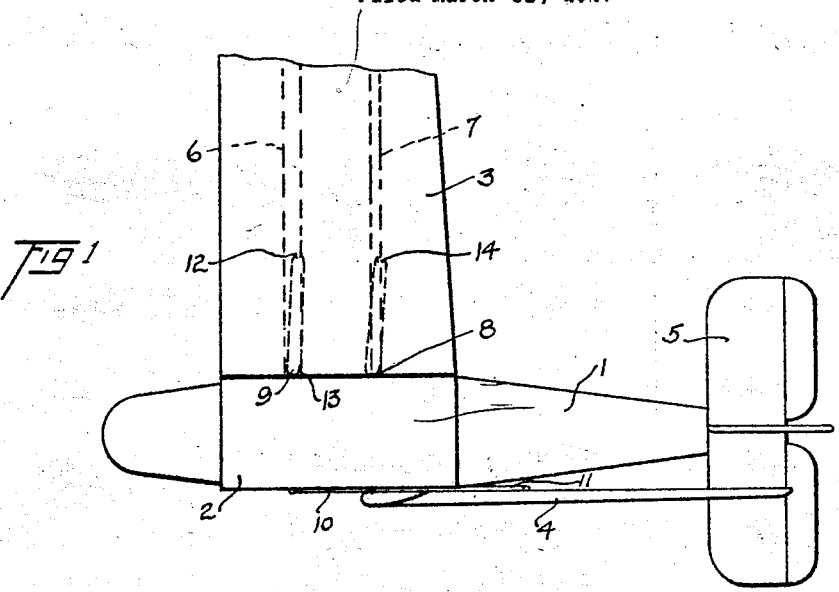
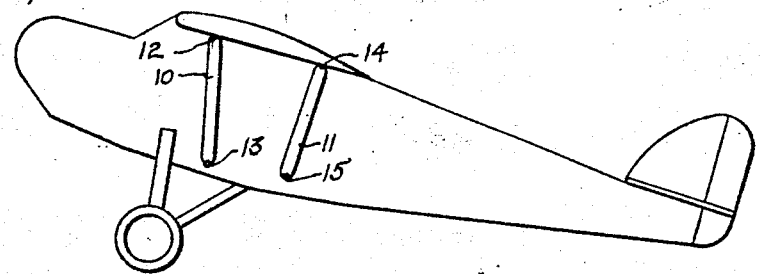
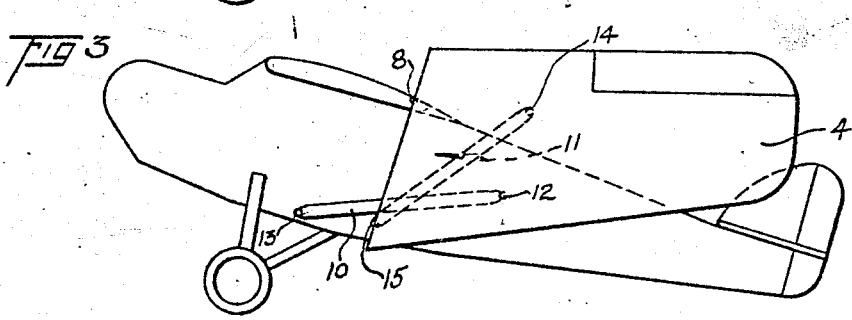
Inventor
Frederick R. Weymouth
By Edward T. Noig
Attorney Patented Aug. 6, 1929.

1,723,962

UNITED STATES PATENT OFFICE.

FREDERICK R. WEYMOUTH, OF HEMPSTEAD, NEW YORK, ASSIGNOR TO FAIRCHILD AIRPLANE MANUFACTURING CORPORATION, OF NEW YORK, N. Y.

FOLDING WING.

Application filed March 31, 1927. Serial No. 179,925.

This invention relates to airplanes which are provided with wing sections adapted to fold along the fuselage so that the plane may be more readily housed.

In its preferred form the invention comprises a wing section of an airplane which is supported at one point to the fuselage or other support and which is provided with a detachable connection spaced substantially longitudinally therefrom, and a pair of bracing struts connected to the fuselage and wing in such a manner that the wing may be folded back and also assume a vertical position along the fuselage without disconnecting the attachments of the brace struts. In this embodiment of the invention the brace struts govern the movement of the plane as it folds rearwardly, and they are so attached at their lower ends to the fuselage as to assume a crossed position substantially parallel to the plane of the wing section when the latter is in its folded position. Attachment of the struts at each end by means of universal joints allows the necessary freedom of movement, so that when the forward detachable wing connection is unfastened the wing may be suitably controlled as it is manually moved into its folded position with the wing tip slightly raised above the level of the elevator planes at the rear of the fuselage.

The embodiment outlined above is illustrated somewhat diagrammatically in the accompanying drawings, in which Fig. 1 is a plan view of an airplane showing one wing in its folded position, Fig. 2 is a side elevation of the airplane showing the wing in its flying position, and Fig. 3 is a side elevation of the airplane showing the wing section folded along the fuselage.

Referring more particularly to the drawings by reference numerals, the fuselage of the airplane 1 is shown as equipped with the central wing section or supporting frame 2 to which the right and left wing sections 3 and 4 are attached. The customary forward propeller, not shown, and the rear tail control surfaces 5 are provided.

The wing sections 3 and 4 are provided with the forward wing beams 6 and the rear wing beams 7. The inner end of the wing beam 7 of each section is attached to the support 2 by means of a suitable universal joint 8. The forward wing beams 6 are provided at their inner ends with a detachable connection 9 which attaches the wing beam to a corresponding continuation thereof in the central section 2. This forward connection 9 is spaced longitudinally of the connection 8 and may be made readily detachable in any suitable manner as by use of the customary pivot or hinge pin.

The outer portions of each wing section are connected and suitably braced by means of the bracing struts 10 and 11, the bracing strut 10 being connected at the point 12 to the forward wing beam at a point spaced laterally from the fuselage, and being connected at 13 to the fuselage. The rear brace strut 11 is connected at 14 to the rear wing beam of the wing section and at 15 to the fuselage. The connections or joints 12, 13, 14, and 15, are suitable ball or universal joints which allow adequate freedom of movement, and the brace struts 10 and 11 are so arranged that the wing section may be folded back along the fuselage to assume a position with its chord substantially vertical and with the wing section extending in a general fore and aft or longitudinal direction. The brace struts 10 and 11 are adapted to cross as shown in Fig. 3, when the wing is folded so that the brace struts are located in a plane adjacent to and parallel with the wing section.

The point 14 of the wing section is constrained to move in a circular arc about the axis thru points 8 and 15. At the same time by virtue of the fixed length of the strut 10 and the rigid structure of the wing and fuselage, the point 12 of the wing is constrained to move in a circular arc about the axis thru points 8 and 13. That is, the forward edge is swung downwardly; or, more generally, the wing is tilted out of the normal plane. By proper proportioning of the length of the struts and the relative location of the points of connection to the wing section and to the fuselage, the wing may be manually folded so that its leading edge at the wing tip just clears the top of the stabilizer by any suitable desired amount.

It will now be apparent that the wing may be moved from its flying position into its folded position merely by the release or unfastening of the detachable connection provided at the inner end of the forward wing beam, and then swinging the wing in a generally downward and rearward direction.

The connections at the ends of the struts 10 and 11 are not disturbed as it is intended these struts shall act to guide the plane in its rearward movement. The inner rear portion of the wing section will be raised a suitable amount so as to clear the section 2 on which it is supported as soon as the wing starts to move backwardly, and consequently it will be unnecessary to provide any large cut-out portion which, in prior constructions, has been necessary to prevent the interference of the inner rear portions of the wing section, with the adjacent rear portions of the central section or fuselage to which it is supported.

Altho my invention has been shown and described as pertaining to an airplane in which the wings are adapted to fold backwardly and in which the monoplane is braced by downwardly and inwardly inclined brace struts, it will be obvious that my invention is capable of various modifications without departing from the spirit or scope thereof. I do not intend to be limited to the form chosen herein for purposes of illustration.

I claim:

1. In an airplane having a folding wing adapted to be folded parallel to the line of flight, a support, a pivotal connection attaching the inner end of the wing to the support, a separable connection spaced substantially longitudinally from said pivotal connection, a strut connected to a part of the wing outwardly beyond the pivotal connection and connected at its other end to a stationary part of the support, and means bracing said wing to the support so that said wing may be folded without disconnecting said means, said strut or said pivotal connection.

2. In an airplane having a folding wing adapted to be folded substantially vertically parallel to the line of flight, a support, a pivotal connection attaching the inner end of the wing to the support, a separable connection spaced substantially longitudinally from said pivotal connection, a strut inter-connecting an outer part of the wing to the support, and a rigid brace spaced at both ends from said strut connecting said wing to the support so that said wing may be folded to extend substantially vertically and longitudinally without disconnecting either said strut or said pivotal connection, or disturbing the point of connection between the brace and the support.

3. In an airplane having a folding wing adapted to be folded substantially vertically parallel to the line of flight, a support, a pivotal connection attaching the wing to the support, a separable connection spaced substantially longitudinally from said pivotal connection, a strut interconnecting an outer part of the wing to the support, and a rigid brace movable relatively to said strut connecting said wing to the support so that said wing may be folded without disconnecting said strut, said brace, or said pivotal connection.

4. In an airplane having a folding wing adapted to be folded substantially vertically parallel to the line of flight, a support, a pivotal connection attaching the wing to the support, a separable connection spaced substantially longitudinally from said pivotal connection, an inclined strut inter-connecting an outer part of the wing to the support, and an inclined rigid brace spaced from said strut and connecting said wing to the support so that said wing may be folded with the strut and brace lying substantially parallel to the wing and adjacent thereto without disconnecting either said strut, said brace, or said pivotal connection.

5. In an airplane having a folding wing adapted to be folded parallel to the line of flight, a support, a universal pivotal connection attaching the wing to the support, a separable connection spaced substantially longitudinally from said pivotal connection, an inclined strut, having universal connections to the outer part of the wing and to the support, and an inclined rigid brace spaced from and lying substantially parallel to said strut and inter-connecting said wing to the support, said rigid brace being connected by freely pivoting connections to the wing and to the support, so that said wing may be folded to extend vertically and longitudinally with a strut and brace lying substantially parallel to the wing without disconnecting said brace, said strut, or said pivotal connection.

6. In an airplane having a folding wing adapted to be folded back parallel to the line of flight to a vertical position, a support, a pivotal connection attaching the inner end of the wing to the support, a separable connection spaced forward of the said pivotal connection, a downwardly and inwardly inclined strut inter-connecting an outer part of the wing to the support, and a downwardly and inwardly inclined brace spaced from said strut and lying substantially parallel thereto and bracing said wing to the support, so that said wing may be folded to extend vertically and longitudinally without disconnecting said strut, said brace, or said pivotal connection.

7. In a monoplane having folding wing sections adapted to be folded back parallel to the line of flight to a vertical position, a support, a pivotal connection attaching the inner end of the wing to the support, a separable connection spaced forward of the said pivotal connection, a downwardly and inwardy inclined strut inter-connecting an outer part of the wing to the support, and a downwardly and inwardly inclined brace spaced from said strut and lying substantially parallel thereto and bracing said wing to the support, so that said wing may be folded to extend vertically and longitudinally without disconnecting said strut, said brace, or said pivotal connection, the points of connection of the lower ends of said strut and brace being so located on the fuselage as to cause the brace and strut to cross and lie in planes parallel to the wing and adjacent to the wing when the latter is in its folded position.

8. In a monoplane having folding wing sections adapted to be folded back substantially vertically and parallel to the line of flight, front and rear wing beams for said sections, a fuselage, a freely pivoting connection attaching the inner end of the rear wing beam permanently to the support, a separable connection spaced forwardly of said pivotal connection and attaching the inner end of the forward wing beam to the support, a downwardly and inwardly inclined strut having freely pivoting connections to an outer part of the wing and to the fuselage, and a downwardly and inwardly inclined rigid brace spaced from and lying substantially parallel to said strut and attached at its upper and lower ends by freely pivoting connections to the wing and to the fuselage, so that said wing may be folded with the strut and brace lying substantially against the wing with the wing extending rearwardly and vertically.

9. In a folding wing airplane a body section, a folding wing supported by a plurality of struts each of said struts being otherwise separately fixedly mounted for universal movement and adapted to guide said wing in its folding movements about two axes to a position alongside said body section about a plurality of axes to a position alongside said body section.

10. In a folding wing airplane a body section, a folding wing supported from said body section by a universal connection, a plurality of braces attached to said body section at spaced points and to said wing at spaced points outwardly beyond said universal connection for supporting said wing in flying position and guiding said wing in folding movements.

11. In a device of the class described, the combination of a body section, a universal connecting device, a plurality of braces having definite immovable points of attachment to the body section, and a folding wing supported from said body section by said universal connection and said braces and guided by said braces in its folding movement, said braces being relatively movable with relation to the wing and to each other.

12. In a folding wing airplane, a body, a folding wing, a brace having a definite immovable point of attachment to the body for supporting said wing in flying position and controlling the folding of said wing about an axis, a second brace for supporting said wing in flying position and controlling the folding of said wing about another axis.

13. In a folding-wing airplane, in combination, a body section, a folding wing pivotally connected near one edge to the body section and releasably connected thereto at a point near the other edge, and longitudinally spaced braces pivotally connected with the wing and pivotally connected with the body section at spaced points, whereby upon release of the releasable connection the wing can be swung toward parallelism with the body and is simultaneously caused to tilt out of the normal plane.

14. In a folding-wing airplane, in combination, a body section, a wing pivotally connected with the body section to permit folding of the wing, releasable means for holding the wing against folding movement and means for bracing the wing in flying position and serving also to cause tilting of the wing out of the normal plane as the wing is folded after release of said releasable means, said means including a plurality of independently movable interconnecting devices attaching the wing to the body section.

In testimony whereof I have hereunto set my hand this 9th day of March, 1927.

FREDERICK R. WEYMOUTH.